May 26, 1959 A. BRUEDER 2,888,121
CENTRIFUGAL CLUTCHES
Filed April 27, 1955
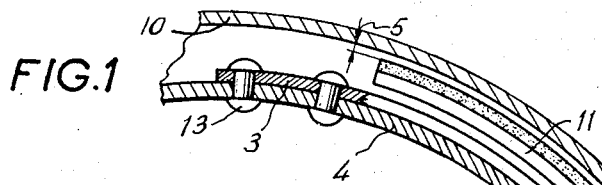
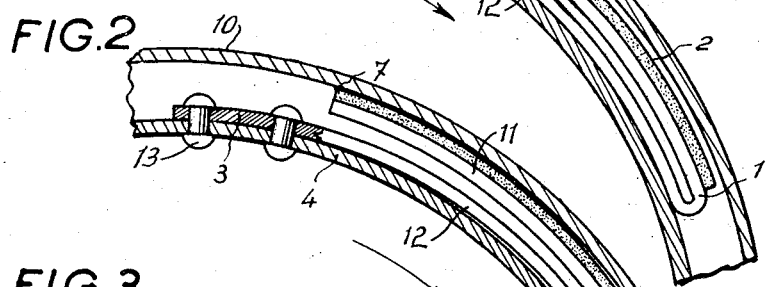
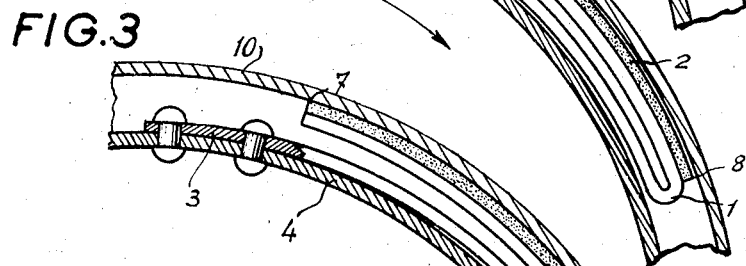
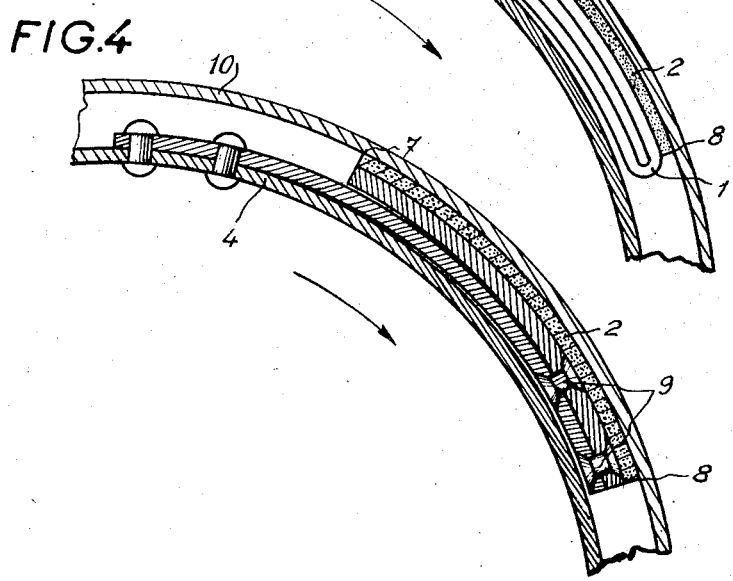
INVENTOR
ANTOINE BRUEDER United States Patent Office 2,888,121
Patented May 26, 1959

2,888,121
CENTRIFUGAL CLUTCHES

Antoine Brueder, Paris, France, assignor to Societe Anonyme Andre Citroen, Paris, France, a corporation of France Application April 27, 1955, Serial No. 504,308

Claims priority, application France July 20, 1954

3 Claims. (Cl. 192—105)

This invention relates to centrifugal clutches of the kind used for rigidly connecting a driving member, e.g. an engine flywheel, to an outer driven member, e.g. a drum by means of masses pivotally mounted at the periphery of the driving member.

The object of the invention is to provide a progressive take up of the drive on starting and to reduce to a minimum the speed variation between the time of initiating the drive and the full engagement of the clutch. To this end each mass is operated by the leading end, in the direction of rotation of the shaft, of a flexible strip or blade which is fixed at its trailing end on the engine flywheel.

In a preferred constructional form of the invention each mass is constituted by a folded spring blade in which the outer surface of the outer limb carries a friction lining and the inner limb of which is fixed at its rear end to the engine flywheel, the closed or folded end of the strip being the leading end in the direction of rotation of the engine.

In the accompanying drawings which illustrate how the invention may be carried into effect:

Fig. 1 is a sectional detail view of a centrifugal clutch, having secured thereto a mass in the form of a folded blade or strip;

Figs. 2 and 3 illustrate, respectively, the positions of the mass shown in Fig. 1 when moving into clutch "engaged" position and on the completion of this movement, and Fig. 4 is a similar view of a modified construction showing the mass in the fully engaged position.

As shown in Fig. 1, the mass consists of a spring blade or strip 1 folded upon itself and having a friction lining 2 on the outer surface, the rear end of the internal part 3 of the mass being fixed to the engine flywheel 4 (the direction of rotation of the engine being denoted by the arrow F).

The thickness and flexibility of the spring blade or strip are designed to provide suitable conditions for initiating the engagement of the clutch and for engaging the clutch as a function of the torque to be transmitted.

Some play 5 (see Fig. 1) is provided between the friction surface and the drum 10 to be driven.

The operation of the clutch is as follows: at idling speed, there is no friction between the friction surface 2 of the mass and the drum 10. As the engine speed increases and proportionally thereto the mass tends to move away from the drum under the action of centrifugal force.

The end 7 being the most flexible part will first be brought into contact with the drum. In view of the direction of rotation no automatic locking engagement will be produced at this end and therefore the drive will be initiated in a smooth and progressive manner. As the engine speed increases the friction surface 2 will come progressively into contact with the drum 10 from the rear end 7 up to the forward end 8. It will therefore be evident that, when the whole surface of the friction lining is in contact with the drum, an automatic locking engagement is produced by reason of the driving direction.

In the modification shown in Fig. 4, in which the parts are shown in the clutch fully engaged position, the spring blade is made in two concentric parts, riveted together at the end 9.

As will be noted in the figures of the drawing the lower branch 12 is of a length at least equal to that of the outer branch and preferably even greater in such a way that the end 13 which is secured is located in back of the member 2 upon the outer leg 11.

What is claimed is:

1. A centrifugal clutch comprising a driving member, a driven member encircling said driving member, A U-shaped flexible strip having an inner and an outer limb, the closed end of said strip being the leading end in the direction of rotation, the trailing end of said inner limb being secured to the periphery of said driving member, the trailing end of said outer limb being free and the outer surface of said outer limb being provided with a friction lining.

2. A centrifugal clutch comprising a driving member, a driven member encircling said driving member, a flexible strip comprising two concentric parts connected together at the leading end forming an inner and an outer limb, the connected end of said strip being the leading end in the direction of rotation, the trailing end of said inner limb being secured to the periphery of said driving member, the trailing end of said outer limb being free and the outer surface of said outer limb being provided with a friction lining.

3. A centrifugal clutch as set forth in claim 1 wherein said inner limb is of greater length than said outer limb and the trailing end of said inner limb is secured to the periphery of said driving member to the rear of said outer limb.

References Cited in the file of this patent

UNITED STATES PATENTS

| 2,375,909 | Fawick | May 15, 1945 |
| 2,762,482 | Davis | Sept. 11, 1956 |

FOREIGN PATENTS

| 32,183 | Austria | Oct. 27, 1906 |